United States Patent Office 2,877,269
Patented Mar. 10, 1959

2,877,269

GUANYL SUBSTITUTED TRIPHENYLETHANES, TRIPHENYLETHYLENES AND BENZALFLUORENES

Marcus G. Van Campen, Jr., and Robert E. Allen, Wyoming, and Frank P. Palopoli and Edward L. Schumann, Cincinnati, Ohio, assignors to The Wm. S. Merrell Company, Cincinnati, Ohio, a corporation of Delaware No Drawing. Application April 17, 1956
Serial No. 578,558

5 Claims. (Cl. 260—564)

This invention relates to new chemical compounds which may be regarded as derivatives of triphenylethylene or triphenylethane.

In general the new compounds are distinguished by their anti-inflammatory and anti-fungal action. Some of the compounds possess anti-fungal activity against, for example, Histoplasma, Trychophyton, Microsporum, Nocardia and Blastomyces organisms. In topical application the combination of their anti-fungal and anti-inflammatory activity is especially advantageous. Thus, for example, in treating athlete's foot and similar fungus infections they have a two-fold action of activity against the fungus and counteracting the inflammation. Their anti-fungal action is useful in preventing infections in treatment of, for example, poison ivy inflammations, insect bites, dermatitis and chronic ulceration. For topical use the compounds can be incorporated into creams, ointments or lotions. The compound can be present in general in a 1% to 10% concentration. In aerosol spray lotions the concentration can be about 0.05 to 1%.

The new compounds appear to differ from known triphenylethylene and triphenylethane derivatives in their physiological action. Thus, it is known that certain triphenylhaloethylenes have estrogenic properties. The compounds of the present invention, however, have substantially no estrogenic properties but have physiological activity upon other parts of the endocrine system and exhibit valuable physiological activities. Thus, some have eosinopenic activity, some produce changes in adrenal ascorbic acid, some are anti-inflammatory, either because of local action or by virtue of systemic hormonal activity or both, and some inhibit granuloma formation. The new substances produce some or all of these responses in varying degree, and for this reason they are valuable in non-endocrine inflammatory diseases and in endocrine disturbances in which changes in hormonal activity are desirable, for example, in inflammatory lesions of the eye and in so-called collagen diseases. Also, some of the compounds exhibit anti-atherosclerotic activity.

As far as we have been able to determine, the compounds are useful primarily in topical application, although some are useful orally.

The new compounds of the invention are derivatives of triphenyl ethylene or triphenylethane in which not more than one of the three phenyl groups is substituted by a carbon-linked guanyl group, and in which the monoaryl substituted carbon atom of the ethylene or ethane group is linked to either hydrogen or a halogen. Thus, the new compounds of the invention have the formula:

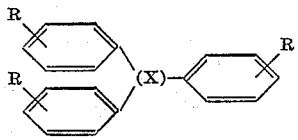

in which only one of the groups represented by R is a carbon-linked guanyl group and in which the other groups represented by R are hydrogen, halogen, lower alkyl, lower alkoxy or lower dialkylamino groups. X is an ethylene or ethane group selected from

and

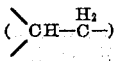

Also, when X is

the two aryl groups on the same carbon atom of X can be bridged to form a fluorene group with the carbon atom of X. $R_1$ is hydrogen or halogen. Useful halogens include chlorine and bromine.

Thus, when X is

the ethylene compounds have the formula

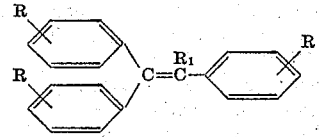

When X is (—CH—CH$_2$—) the ethane compounds have the formula

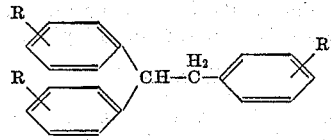

When the two aryl groups on the same carbon atom are bridged to form a fluorene radical, the ethylene compounds have the formula

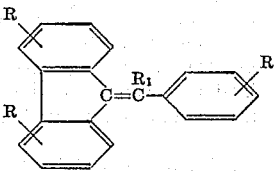

The guanyl group can be mono- or di-substituted, as by lower alkyl groups, such as methyl, ethyl and propyl. Alternatively, the guanyl group can contain as a substituent on the amido nitrogen a dialkylaminoalkyl group of the type —(A)—N(R')$_2$ where A is a straight or branched carbon chain of 2 to 5 carbon atoms and R' is a lower alkyl radical, e. g., a methyl, ethyl or propyl radical. Alternatively, the guanyl group can be part of a cyclic structure such as pyrimidyl, e. g., dimethyl pyrimidyl, or tetrahydropyrimidyl, or imidazolinyl, providing the cyclic structure has no more than 7 carbon atoms including those of the ring structure and substituents thereon. Alternatively, the amido nitrogen of the guanyl group can be part of a heterocyclic ring structure such as aziridino, pyrrolidino, piperidyl or morpholinyl. By the term "a carbon-linked guanyl group" as used herein we means to include the above-described guanyl groups.

The groups represented by R can be attached to the ring structures in the ortho, meta or para positions. Many of the compounds exist in the form of geometric isomers, and in some cases both the cis- and trans-forms have been isolated. For purposes of the present invention, no distinction is made between geometric isomers.

The compounds of the invention are advantageously prepared from the corresponding halogen (preferably bromine) substituted triarylethylenes or ethanes, as by replacement of a nuclear-substituted halogen atom by a cyano group, followed by, for the production of the imidoester, alcoholysis. The guanyl compounds are obtained from the imidoesters or their salts by treatment with ammonia or salts of ammonia. Where the N-monosubstituted guanyl compounds are desired, they are obtained from the imidoester salts by treatment with limited amounts of primary amines, while the N,N-di-substituted guanyl compounds are obtained with the use of an excess of a primary amine under somewhat more vigorous conditions. The N,N-di-substituted compounds are obtained from the cyano compounds by treatment with a reagent derived from the selected secondary amine and a Grignard reagent. The guanyl compounds which contain a dialkylaminoalkyl group on the amido nitrogen are prepared by treating the imidoester with a dialkylamino substituted alkylamine.

The guanyl compounds in which the two nitrogens form part of a heterocyclic ring structure (e. g., in which the guanyl structure is contained within an imidazoline or pyrimidine ring) are prepared by treating the imidoester with a diamino compound such as ethylene diamine or 2,3-diaminobutane or by treating the unsubstituted guanyl compound with a 1,3-diketone or beta-ketoester such as acetylacetone or acetoacetic ester. The guanyl compounds in which the amido nitrogen is part of a heterocyclic ring structure, e. g., piperidine, are prepared by treating the imidoester with a heterocyclic compound, e. g., piperidine. Also, they can be obtained by the treatment of the cyano compounds with a reagent derived from the heterocyclic and a Grignard reagent.

The production of the new compositions of the invention will be illustrated by the following examples.

*Example 1*

*1,1 - di-p-anisyl-2-p-ethoxycarbiminophenylethylene.*—A solution of 27.2 grams of 1,1-di-p-anisyl-2-p-cyanophenylethylene in 38 gm. of anhydrous ethanol and 500 ml. of dry benzene is saturated with hydrogen chloride at 5° C. and allowed to stand at room temperature for three days. The solvent is evaporated and the residue rubbed with ether to induce crystallization. The 1,1-di-p - anisyl - 2 - p-ethoxycarbiminophenylethylene hydrochloride so obtained is a yellow solid which melts and decomposes at 131°. This compound has anti-inflammatory activity.

By replacing the 1,1-di-p-anisyl-2-p-cyanophenylethylene of this example with a 1-p-anisyl-1-o-anisyl-2-p-cyanophenylethylene there is obtained 1-p-anisyl-1-o-anisyl-2-p-ethoxycarbiminophenylethylene hydrochloride which is an almost white solid with an indefinite melting and decomposition point indicating the presence of stereo isomers. The use of 1,1-di-m-anisyl-2-p-cyanophenylethylene in place of 1,1-di-p-anisyl-2-p-cyanophenylethylene gives 1,1-di-m-anisyl-2-p-ethoxy-carbiminophenylethylene hydrochloride.

*Example 2*

*1,1 - di-p-anisyl-2-p-guanylphenylethylene.*—A suspension of 13.5 gm. of 1,1-di-p-anisyl-2-p-ethoxycarbiminophenylethylene hydrochloride in 100 ml. of chloroform is poured over 160 gm. of cracked ice and neutralized with 30% sodium hydroxide to about pH 8. The chloroform layer is separated and kept at 0° C. while drying over sodium sulfate. The chloroform is then evaporated under reduced pressure and the residue dissolved in 65 ml. of ethanol. This solution is warmed to 60° and treated with 2.5 gm. of ammonium chloride in 5 ml. of water. The mixture is kept at 60° and stirred for six hours, then chilled, filtered, and evaporated to a volume of about 25 ml. A crystalline precipitate of 1,1-di-p-anisyl-2-p-guanylphenylethylene hydrochloride separates which decomposes in a M. P. tube at 252–256° C.

This compound has pronounced acute anti-inflammatory, eosinopenic and anti-granuloma activities. As to the anti-inflammatory activity, its subcutaneous potency is similar to that of cortisone and its oral potency is about one-tenth to one-twentieth that of cortisone. As to the anti-granuloma activity of the compound, its subcutaneous and local potency is, respectively, about 1 to 2½ and 10 to 25 times that of cortisone. The compound also has anti-atherosclerotic activity and is about 5 times as active as $\beta$-sitosterol. The daily dose for this activity is in the range of 200 to 2000 mg./day. The compound also is bactericidal, and anti-fungal.

By reacting 1,1-di-m-anisyl-2-p-ethoxycarbiminophenylethylene hydrochloride with alcoholic ammonia according to the procedure of Example 4, there is obtained 1,1 - di-m-anisyl-2-p-guanylphenylethylene hydrochloride as a white crystalline salt which decomposes without melting. 1-p-anisyl-1-o-anisyl-2-p-guanylphenylethylene hydrochloride is obtained by similar treatment of 1-p-anisyl - 1-o-anisyl-2-p-ethoxycarbiminophenylethylene hydrochloride.

*Example 3*

*1,2 - di-p-anisyl-1-m-ethoxycarbiminophenylethylene.*—A mixture of 10 gm. of 1,2-di-p-anisyl-1-m-cyanophenylethylene, 5 to 6 ml. of absolute ethanol and 165 ml. of dry benzene is saturated at 5° C. with dry hydrogen chloride. After standing at room temperature for nine days the solvent is removed and the residue triturated with dry ether until the material crystallizes. The 1,2-di-p-anisyl-1-m-ethoxycarbiminophenylethylene hydrochloride so obtained has a decomposition point of 119–20° C. by the capillary melting point method.

*Example 4*

*1,2-di-p-anisyl-1-m-guanylphenylethylene.*—Four grams of the imidoester hydrochloride of Example 3 suspended in 20 ml. of absolute ethanol and chilled to −50° C. or below is treated portion-wise with 2 gm. of liquid ammonia. The mixture is warmed slowly and then refluxed gently for six hours. It is then filtered and diluted with dry ether to produce a white precipitate. This material when recrystallized from dry alcohol gives white prisms of 1,2-di-p-anisyl-1-m-guanylphenylethylene hydrochloride which decomposes in a melting point tube at 208–210° C. This compound possesses acute anti-inflammatory, eosinopenic, anti-granuloma and anti-fungal activities.

*Example 5*

*1,1-di - p-anisyl-2-m-ethoxycarbiminophenylethylene.*—When 1,1-di-p-anisyl-2-m-cyanophenylethylene is substituted for the 1,2-di-p-anisyl-1-m-cyanophenylethylene of Example 3 in the procedure of Example 3, 1,1-di-p-anisyl-2-m-ethoxycarbiminophenylethylene hydrochloride is obtained as a white crystalline material having a decomposition point of 140° C.

*Example 6*

*1,1-di-p-anisyl-2-m-guanylphenylethylene.*—When 1,1-di-p-anisyl - 2 - m-ethoxycarbiminophenylethylene hydrochloride is substituted for the dianisylethoxycarbiminophenylethylene of Example 4 in the procedure of Example 4, 1,1-di-p-anisyl-2-m-guanylphenylethylene hydrochloride is obtained. It has a M. P. of 232–233° C. This compound has eosinopenic, anti-inflammatory and anti-granuloma activities.

*Example 7*

*1,1 - di-p-anisyl-2-o-(N,N - diethylguanyl)phenylethylene.*—A 200 ml. portion of approximately 0.28 N diethylaminomagnesium bromide is prepared from ethylmagnesium bromide and diethylamine. To this solution 13.6 gm. of 1,1-di-p-anisyl-2-o-cyanophenylethylene dissolved in a mixture of 100 ml. of dry ether and 100 ml.

of dry benzene is slowly added. The mixture is refluxed six hours and then decomposed with an excess of 10% sodium hydroxide solution. The ether layer is separated and the aqueous layer extracted with chloroform. The ether and chloroform solutions are combined and evaporated to give the product as a yellow gum. This is dissolved in a slight excess of alcoholic hydrogen chloride, diluted with water, and repeatedly extracted with chloroform. The product is extracted into the chloroform layer. The chloroform extracts are washed with 10% sodium hydroxide followed by water. After drying the solution and evaporating the solvent the residue crystallizes from 75–90° petroleum ether, M. P. 109–110°. The hydrochloride salt is obtained by customary procedures as a crystalline substance, M. P. 221–222° C. It has anti-inflammatory, anti-granuloma and anti-fungal activity.

Example 8

*1,2-di-p-anisyl-1-p - ethoxycarbiminophenylethylene.*—By the procedure of Example 3, 1,2-di-p-anisyl-1-p-cyanophenylethylene is converted to 1,2-di-p-anisyl-1-p-ethoxycarbiminophenylethylene hydrochloride. The yellow crystals so obtained have a decomposition point of 118–120° C. by the capillary melting point method.

Example 9

*1,2-di-p-anisyl - 1 - p-guanylphenylethylene.*—Using the procedure described in Example 4, the imidoester hydrochloride of Example 8 is converted to 1,2-di-p-anisyl-1-p-guanylphenylethylene hydrochloride. These yellow crystals are pure after one precipitation from an ethanol solution with dry ether and melt with decomposition at 226° C. by the capillary melting point method. It has eosinopenic, acute anti-inflammatory and anti-granuloma activity. The compound also has anti-atherosclerotic activity and is about 5 times as active as β-sitosterol. The daily dose for this activity is in the range of 200 to 2000 mg./day.

Example 10

*1,2-diphenyl - 1 - m-ethoxycarbiminophenylethylene.*—When 1,2-di-phenyl-1-m-cyanophenylethylene is treated with alcoholic hydrogen chloride by the procedure of Example 3, these ethoxycarbimino derivatives are obtained. From the geo-isomeric cyano-compound melting at 135–137° C. the imidoester hydrochloride obtained has a decomposition point of 142° C. From the geo-isomeric cyano-compound melting at 168–169° C., the imidoester hydrochloride obtained has a decomposition point of 117° C.

Example 11

*1,2 - diphenyl - 1-m-guanylphenylethylene.*—The treatment of 1,2-diphenyl-1-m-ethoxycarbiminophenylethylene hydrochloride with alcoholic ammonia by the procedure of Example 4 gives these guanylphenyl derivatives as the hydrochloride salts. The lower melting imidoester hydrochloride gives a guanyl derivative which decomposes at 234–237° C. The guanyl derivative from the higher melting imidoester hydrochloride melts at 237.5–238.5° C. It has anti-fungal, anti-inflammatory and anti-granuloma activity.

Example 12

*1,1-di-p-anisyl-2-(p-2 - imidazolinylphenyl)ethylene.*—A mixture of 9.6 gm. of 1,1-dianisyl-2-p-ethoxycarbiminophenylethylene hydrochloride and 3.4 gm. of ethylenediamine in 25 ml. of absolute ethanol is refluxed 24 hours. The mixture is diluted with water, the precipitated gum is washed repeatedly with water, dried and dissolved in alcoholic hydrogen chloride. Diluting with anhydrous ether gives a yellow solid which is analytically pure after two recrystallizations from a hot mixture of 50 parts of ethanol, 100 parts of methylethyl ketone and 25 parts of 75–90° petroleum ether. The material, in the form of its hydrochloride, melts at 261–2° C. It has anti-granuloma, anti-inflammatory and anti-fungal activity.

Example 13

*1,1 -di-p-tolyl-2-p-ethoxycarbiminophenylethylene.*—By the procedure of Example 1, using 1,1-di-p-tolyl-2-p-cyanophenylethylene, 1,1-di-p-tolyl-2-p-ethoxycarbiminophenylethylene hydrochloride is obtained which melts and decomposes at 148° C.

Example 14

*1,1-di-p-tolyl-2-p-guanylphenylethylene.*—When 1,1-di-p-tolyl-2-p-ethoxycarbiminophenylethylene hydrochloride is substituted for the dianisyl ethoxycarbiminophenylethylene of Example 4 in the procedure of Example 4, 1,1-di-p-tolyl-2-p-guanylphenylethylene hydrochloride, melting at 314° C., is obtained. It has acute anti-inflammatory activity.

Example 15

*1,1 - di-p-anisyl - 2-p-2(1,4,5,6 - tetrahydropyrimidyl)-phenylethylene.*—An imidoester base is obtained from 8.5 gm. of 1,1-di-p-anisyl-2-p-ethoxycarbiminophenylethylene hydrochloride by suspending the ethylene compound in chloroform and ice and neutralizing the compound with 20% sodium hydroxide, then with 10% sodium carbonate to pH 7 and separating the chloroform layer, drying it over sodium sulfate at 0° C., and evaporating under reduced pressure at 20–30° C. to obtain the imidoester base. The base is mixed with 1:8 ml. of 1,3-diaminopropane in 25 ml. of absolute ethanol and refluxed for 28 hours. The solvent and excess diamine are removed under vacuum, the residue is dissolved in 10 to 15 ml. absolute ethanol and rendered slightly acidic with alcoholic hydrogen chloride. Diluting with dry ether to the point of cloudiness results in yellow crystals of the tetrahydropyrimidyl derivative in the form of its hydrochloride, melting at 238–40° C. It has acute anti-inflammatory activity.

Example 16

*1,1 - di - p -anisyl - 2-p - piperidinocarbiminophenylethylene.*—A mixture of 10 gm. of 1,1-di-p-anisyl-2-p-ethoxycarbiminophenylethylene hydrochloride and 4 gm. of piperidine in 25 ml. absolute ethanol is allowed to stand at room temperature for two days. The solvent is removed, the residue is taken up in chloroform and washed repeatedly with water, then the solvent is removed and the gum is triturated with 75–90° B. P. petroleum ether until free of excess piperidine. The hydrochloride is formed by dissolving the gum in ethanol, making slightly acidic with alcoholic hydrogen chloride and precipitating with dry ether. Recrystallized from absolute ethanol and ether, the material melts with decomposition at 150° C. The compound has acute anti-inflammatory activity.

The piperidine may be replaced by pyrrolidine or morpholine in equivalent molar quantity to give the pyrrolidino and morpholino analogs which are also gummy substances capable of conversion to crystalline hydrochlorides.

Example 17

*1,1-di-p-tolyl-2 - p-(2 - imidazolinyl)phenylethylene.*—When 1,1-di-p-tolyl-2-p - ethoxycarbiminophenylethylene hydrochloride of Example 13 is substituted for 1,1-di-p-anisyl-2-p-ethoxycarbiminophenylethylene hydrochloride in the procedure of Example 12, there is obtained 1,1-di-p-tolyl-2-p-(2-imidazolinyl)phenylethylene in the form of its hydrochloride melting at 268–9° C. It has anti-inflammatory activity.

Example 18

*1,1-di-p-anisyl-2 - p - (N - 1 - diethylamino - 4-pentyl)-guanylphenylethylene.*—A mixture of 8.5 gm. of 1,1-di-p-anisyl-2-p-ethoxycarbiminophenylethylene hydrochloride and 4.9 gm. of 1-diethylamino-4-aminopentane in 35 ml.

of absolute ethanol is refluxed two hours, the solvent is removed and the residue is washed with dry ether. The material is dissolved in 10 percent hydrochloric acid, precipitated with 25 percent sodium carbonate, washed with water and dissolved in alcoholic hydrogen chloride. Diluting with dry ether gives 1,1-di-p-anisyl-2-p-(N-1-diethylamino-4-pentyl)guanylphenylethylene dihydrochloride, decomposing at 140° C. It has anti-granuloma and anti-inflammatory activity.

Example 19

*1,1-bis-p-chlorophenyl-2-p-ethoxycarbiminophenylethylene.*—A mixture of 16.5 gm. of 1,1-bis-p-chlorophenyl-2-p-cyanophenylethylene, 27 ml. of absolute ethanol and 250 ml. of dry benzene is saturated at 5° with dry hydrogen chloride. After standing at room temperature for a day the solvent is removed and the residue is triturated with dry ether. The 1,1-bis-p-chlorophenyl-2-p-ethoxycarbiminophenylethylene hydrochloride so obtained has a decomposition point of 129–130° C. by the capillary melting point method.

Example 20

*1,1-bis-p-chlorophenyl-2-p-guanylphenylethylene.*—To a suspension of 9.0 gm. of 1,1-bis-p-chlorophenyl-2-p-ethoxycarbiminophenylethylene hydrochloride in 50 ml. of anhydrous ethanol is added an excess of alcoholic ammonia. The mixture is refluxed three hours, the solvent is removed by vacuum and the residue is crystallized from methanol and ethyl acetate. The 1,1-bis-p-chlorophenyl-2-p-guanylphenylethylene hydrochloride obtained melts at 306–7° C. by the capillary melting point method. It has anti-granuloma, anti-inflammatory and anti-fungal activity.

Example 21

*1,1-bis-p-chlorophenyl-2-(p-2-imidazolinyl)phenylethylene.*—A mixture of 8.2 gm. of 1,1-bis-p-chlorophenyl-2-p-ethoxycarbiminophenylethylene hydrochloride, 2.3 gm. of ethylenediamine and 30 ml. of absolute ethanol is refluxed three hours, the solvent is removed by boiling and the residue is washed repeatedly with water. The product is dissolved in methanol, rendered acid with alcoholic hydrogen chloride and allowed to crystallize from a mixture of methanol and water. After drying at 120° C. and 1 mm. pressure for 6 hours, 1,1-bis-p-chlorophenyl-2-(p-2-imidazolinyl)phenylethylene hydrochloride is obtained with a melting point of 282° C. It has anti-inflammatory and anti-fungal activity.

Example 22

*1-p-ethoxycarbiminophenyl-1-phenyl-2-p-chlorophenylethylene.*—By treating 1-p-cyanophenyl-1-phenyl-2-p-chlorophenylethylene with alcoholic hydrogen chloride using the procedure of Example 19, these ethoxycarbiminio derivatives are obtained. From the geo-isomeric cyano-compound melting at 171–2° C., the imidoester hydrochloride obtained has a decomposition point of 174° C. From the geo-isomeric cyano-compound melting at 126–30° C. the imido-ester hydrochloride obtained has a decomposition point of 161° C.

Example 23

*1-p-guanylphenyl-1-phenyl-2-p-chlorophenylethylene.*—By treatment of 1-p-ethoxycarbiminophenyl-1-phenyl-2-p-chlorophenylethylene hydrochloride with alcoholic ammonia by the procedure of Example 2 gives these guanylphenyl derivatives as the hydrochloride salt. The higher melting imidoester hydrochloride gives a guanyl derivative melting at 290° C. The guanyl derivative from the lower melting imidoester hydrochloride melts at 245° C. This compound has glucocorticoid activity.

Example 24

*1-p-piperidinocarbiminophenyl-1-phenyl-2-p-chlorophenylethylene.*—A mixture of 10 gm. of the imidoester hydrochloride of Example 22 melting at 126–30° C., 2.2 gm. of piperidine and 35 ml. of absolute ethanol is refluxed 6 hours. The solvent is removed and a chloroform solution of the residue is washed with water. Removal of the chloroform and trituration of the residue gives 1-p-piperidinocarbiminophenyl-1-phenyl-2-p-chlorophenylethylene hydrochloride melting at 225° C. This compound has glucocorticoid activity.

Example 25

*1-o-chlorophenyl-1-p-chlorophenyl-2-p-ethoxycarbiminophenylethylene.*—The treatment of 31.5 gm. of 1-o-chlorophenyl-1-p-chlorophenyl-2-p-cyanophenylethylene with alcoholic hydrogen chloride as described in Example 19 gives 1-o-chlorophenyl-1-p-chlorophenyl-2-p-ethoxycarbiminophenylethylene hydrochloride decomposing over a range of 110 to 130° C.

Example 26

*1-o-chlorophenyl-1-p-chlorophenyl-2-p-guanylphenylethylene.*—When the imidoester hydrochloride of Example 25 is treated with alcoholic ammonia by the procedure of Example 20, 1-o-chlorophenyl-1-p-chlorophenyl-2-p-guanylphenylethylene hydrochloride is obtained with a melting point of 315° C.

Example 27

*1,2-di-p-anisyl-2-p-ethoxycarbiminophenylchloroethylene.*—1,2-di-p-anisyl-2-p-cyanophenylchloroethylene is treated with anhydrous alcoholic hydrogen chloride as in Example 1. 1,2-di-p-anisyl-2-p-ethoxycarbiminophenylchloroethylene hydrochloride is obtained decomposing at 167° C. The 1,2-di-p-anisyl-2-p-cyanophenylchloroethylene is obtained by treating 1,2-di-p-anisyl-2-p-cyanophenylethylene in chloroform with a carbon tetrachloride solution of chlorine.

Example 28

*1,2-di-p-anisyl-2-p-guanylphenylchloroethylene.*—When the imidoester hydrochloride of Example 27 is treated with alcoholic ammonia by the procedure of Example 20, 1,2-di-p-anisyl-2-p-guanylphenylchloroethylene hydrochloride is obtained with a melting point of 135° C. It has anti-inflammatory and anti-fungal activity.

Example 29

*1,1-di-p-anisyl-2-p-guanylphenylbromoethylene.*—By replacing 1,2-di-p-anisyl-2-p-cyanophenylchloroethylene in Example 27 with 1,1-di-p-anisyl-2-p-cyanophenylbromoethylene, 1,1-di-p-anisyl-2-p-ethoxycarbiminophenylbromoethylene hydrochloride is obtained melting at 144–145° C. The bromoethylene is obtained by using bromine in place of chlorine in the procedure of Example 27. The imidoester hydrochloride is treated with alcoholic ammonia as in Example 20 to give 1,1-di-p-anisyl-2-p-guanylphenylbromoethylene hydrochloride melting at 237° C.

Example 30

*1,1-di-p-anisyl-2-m-ethoxycarbiminophenylethane.*—Hydrogenation of 1,1-di-p-anisyl-2-m-bromophenylethylene in ethyl acetate with 3 atmospheres of hydrogen using $PtO_2$ catalyst results in 1,1-di-p-anisyl-2-m-bromophenylethane. Treatment of this bromo compound with cuprous cyanide in boiling quinoline gives 1,1-di-p-anisyl-2-m-cyanophenylethane, an oil boiling at 232–4°/0.4 mm. By treating the cyano compound with alcoholic hydrogen chloride using the procedure of Example 1, 1,1-di-p-anisyl-2-m-ethoxycarbiminophenylethane hydrochloride is obtained, decomposing at 130° C.

Example 31

*1,1-di-p-anisyl-2-m-guanylphenylethane.*—By treating the imidoester hydrochloride of Example 30 with alcoholic ammonia using the procedure of Example 20, 1,1-di-p-anisyl-2-m-guanylphenylethane hydrochloride is obtained decomposing at 200° C. It has anti-inflammatory and anti-fungal activity.

Example 32

*1-p-ethoxycarbiminophenyl - 1 - phenyl - 2 - p - chlorophenylethane.*—By hydrogenating 1-p-bromophenyl-1-phenyl-2-p-chlorophenylethylene and treating the resulting ethane with cuprous cyanide as in Example 30, 1-p-cyanophenyl-1-phenyl - 2 - p - chlorophenylethane is obtained, melting at 150–8° C. By treating the cyano compound with alcoholic hydrogen chloride using the procedure of Example 1, 1-p-ethoxycarbiminophenyl-1-phenyl-2-p-chlorophenylethane hydrochloride is obtained, decomposing at 166° C.

Example 33

*1-p-guanylphenyl-1-phenyl-2 - p-chlorophenylethane.*— Treating the imidoester hydrochloride of Example 32 with excess alcoholic ammonia by refluxing for two hours and evaporating the solvent, the residue is washed with water to give 1-p-guanylphenyl-1-phenyl-2-p-chlorophenylethane hydrochloride, melting at 274–9° C. It has anti-granuloma activity.

Example 34

*1 - p - piperidinocarbiminophenyl-1 - phenyl-2-p-chlorophenylethane.*—By treating the imidoester hydrochloride of Example 32 with piperidine using the procedure of Example 24, 1-p-piperidinocarbiminophenyl-1-phenyl-2-p-chlorophenylethane hydrochloride is obtained, melting at 258° C. It has anti-granuloma activity.

Example 35

*2-ethoxycarbimino-9-anisalfluorene.*—A solution of 8.8 gm. of 2-cyano-9-anisalfluorene in 125 ml. dry benzene, 19 ml. ethanol and 100 ml. chloroform is saturated at 5° C. then allowed to stand at room temperature for two days. After removing the solvent under vacuum at 30° C., the residue is triturated with dry ether to give 2-ethoxycarbimino-9-anisalfluorene hydrochloride, decomposing at 140° C.

Example 36

*2-guanyl-9-anisalfluorene.*—A mixture of 10.3 gm. of the imidoester hydrochloride of Example 35 in 75 ml. ethanol and excess alcoholic ammonia is refluxed an hour and the solvent is removed. The residue is dissolved in chloroform, filtered and the volume reduced to 30 ml., ethyl acetate is added which causes precipitation, then enough isopropanol is added to the hot suspension until it clears. Crystals of 2-guanyl-9-anisalfluorene hydrochloride are obtained, melting at 130° with decomposition. It has anti-granuloma and anti-inflammatory activity.

Example 37

*9-p-ethoxycarbiminobenzalfluorene.*—By treating 9-p-cyanobenzalfluorene with alcoholic hydrogen chloride using the procedure of Example 1, 9-p-ethoxycarbiminobenzalfluorene hydrochloride is obtained melting at 263–4° C.

Example 38

*9-p-guanylbenzalfluorene.*—A mixture of 16 gm. of the imidoester hydrochloride of Example 37 in 100 ml. ethanol and excess ammonia is refluxed 12 hours and the solvent is then removed. The product is crystallized from isopropanol-methanol (4:1) to give 9-p-guanylbenzalfluorene hydrochloride, melting at 308° C. It has anti-granuloma, anti-inflammatory and anti-fungal activity.

Example 39

*2,7-dichloro-9-p-ethoxycarbiminobenzalfluorene.*—A solution of 10.2 gm. of 2,7-dichloro-9-p-cyanobenzalfluorene in 200 ml. dry benzene and 30 ml. ethanol is saturated at 0° with anhydrous hydrogen chloride. After standing at room temperature for three days the solvent is removed and the residue is washed with hot, dry benzene and the insoluble portion obtained is 2,7-dichloro-9-p-ethoxycarbiminobenzalfluorene hydrochloride.

Example 40

*2,7-dichloro-9-p-guanylbenzafluorene.*—The imidoester hydrochloride of Example 39 is refluxed in 50 ml. ethanol containing an excess of ammonia for four hours, then filtered, the solvent is removed and the residue is washed with hot benzene. The insolubles are shaken in chloroform with excess 10 percent sodium hydroxide, filtered and the chloroform layer is washed with water, then made acidic with alcoholic hydrogen chloride. The chloroform is replaced with methanol and dry ether is added to give 2,7-dichloro-9-p-guanylbenzalfluorene hydrochloride melting at 315° C. It has anti-granuloma activity.

Example 41

*1-p-tolyl-1-p-chlorophenyl-2-p-guanylphenyl-ethylene.*— 1 - p - tolyl - 1 - p - chlorophenyl - 2 - p-ethoxycarbimino - phenylethylene hydrochloride, prepared from the corresponding nitrile by the action of alcoholic hydrogen chloride, is treated with alcoholic ammonia to give 1-p-tolyl-1-p-chlorophenyl-2-p-guanylphenylethylene hydrochloride melting in the range of 260–270° C. The nitrile is prepared from 1-p-tolyl-1-p-chlorophenyl-2-p-bromophenylethylene by the reaction with cuprous cyanide in quinoline. The latter is obtained from 4-methyl-4-chlorobenzophenone and p-bromobenzylmagnesium bromide.

Example 42

*1 - p - anisyl - 1 - p - chlorophenyl - 2 - p - guanylphenylethylene.*—Following the procedure outlined in Example 41 but starting with 4-methoxy-4'-chlorobenzophenone, 1-p-anisyl-1-p-chlorophenyl-2-p-guanylphenylethylene hydrochloride is obtained, melting in a range of 220–228° C.

Example 43

*1,1 - bis - p - dimethylaminophenyl - 2 - p - ethoxycarbiminophenylethylene.*—By treatment of 11.3 gm. of 1,1 - bis - p - dimethylaminophenyl - 2 - p - cyanophenylethylene in 75 ml. of dry benzene, 40 ml. of absolute ethanol and 150 ml. of dry chloroform with anhydrous hydrogen chloride at 5° C. until saturated, then allowing the solution to stand at room temperature for 16 hours, the trihydrochloride of 1,1-bis-p-dimethylaminophenyl-2-p-ethoxycarbiminophenylethylene is obtained. By drying at 100° C. at 1 mm. for 8 hours, the monohydrochloride is obtained, decomposing at 160° C.

Example 44

*1,1 - bis - p - dimethylaminophenyl - 2 - p - guanylphenylethylene.*—A mixture of 6 gm. of 1,1-bis-p-dimethylaminophenyl-2-p-ethoxycarbiminophenylethylene trihydrochloride in 25 ml. of absolute ethanol is refluxed with an excess of ammonia for an hour. A chloroform solution of the reaction mixture is washed twice with water, the volume of organic solution is reduced and diluted with ethyl acetate. 1,1-bis-p-dimethylaminophenyl-2-p-guanylphenylethylene hydrochloride is obtained, decomposing at 173° C. This compound has high anti-fungal activity.

Example 45

*1,1 - bis - p - dimethylaminophenyl - 2 - p - piperidinocarbiminophenylethylene.*—A mixture of 6 gm. of the trihydrochloride of the imidoester of Example 43, 1.05 ml. of piperidine and 5.5 ml. of triethylamine in 25 ml. of absolute ethanol is refluxed two hours. The solvent is replaced by chloroform, washed twice with water; by diluting the chloroform solution with ethyl acetate and dry ether, 1,1-bis-p-dimethylaminophenyl-2-p-piperidinocarbiminophenylethylene hydrochloride is obtained, decomposing at 152° C. This compound has high anti-fungal activity.

Example 46

*9-[p-(N-β-diethylaminoethyl)guanylbenzal] fluorene.*—When 15.5 gm. of the imidoester hydrochloride of Example 37 is treated with 4.1 gm. of β-diethylaminoethylamine in 50 ml. of ethanol at room temperature for 16 hours, then isolated as the free base and converted to the hydrochloride as in Example 40, yellow crystals are obtained which when recrystallized from methanol and isopropanol, melt at 297° C. with decomposition. It has both oral and parenteral anti-inflammatory activity. It is orally active in 30 mg./kg. doses.

Example 47

*1,1 - di - p - anisyl - 2 p - N -(β - diethylaminoethyl) guanylphenylethylene.*—When the imidoester hydrochloride of Example 1 is used in the place of the imidoester of Example 37 in the procedure of Example 46, a yellow crystalline product is obtained which when crystallized from isopropanol and ethyl acetate gives 1,1-di-p-anisyl-2-p-N-(β-diethylaminoethyl)guanylphenylethylene hydrochloride, decomposing at 239° C. It has both oral and parenteral anti-inflammatory activity. It is orally active in 30 mg./kg. doses.

The nitriles (cyano compounds) used as starting materials for the preparation of the various compounds of the examples, were prepared by reaction of the correspondingly halogen-substituted, usually bromo-substituted, compound with a heavy metal cyanide, usually cuprous cyanide, in the presence of a high boiling tertiary amine, usually quinoline, with replacement of the halogen by the nitrile group. The halogen compounds in turn were obtained by the condensation of the correspondingly substituted benzophenone with the correspondingly substituted benzylmagnesium halide, followed by dehydration of the resulting triaryl ethanol using an acid catalyst.

Example 48

*9 - (α - chloro - p - ethoxycarbimino)benzalfluorene.*—When 9-p-cyanobenzalfluorene is treated in chloroform with an equimolar quantity of chlorine in carbon tetrachloride, 9-(α-chloro-p-cyano)benzalfluorene is obtained. When this is treated with alcoholic hydrogen chloride, as in the procedure of Example 1, 9-(α-chloro-p-ethoxycarbimino)benzalfluorene hydrochloride is obtained as a pale yellow amorphous solid.

Example 49

*9-(α-chloro-p-guanyl)benzalfluorene.*—By treating the imidoester hydrochloride of Example 48 with alcoholic ammonia, as in the procedure of Example 38, 9-(α-chloro-p-guanyl)benzalfluorene hydrochloride is obtained as a yellow crystalline substance. It has anti-granuloma, anti-inflammatory and anti-fungal activity.

This application is a continuation-in-part of our application Serial No. 375,078, filed August 18, 1953, now abandoned.

We claim:
1. 1,1-di-p-anisyl-2-p-guanylphenylethylene.
2. Compounds of the formulae selected from the group consisting of

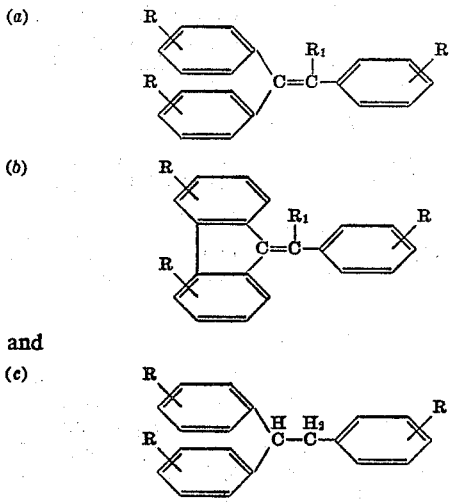

wherein only one of the groups represented by R is a guanyl group attached to a carbon atom of the benzene ring through the carbon atom attached to the two nitrogen atoms of the guanyl group and the remaining groups represented by R are selected from the group consisting of hydrogen, chlorine, bromine, lower alkyl, lower alkoxy and lower dialkylamino groups and $R_1$ is selected from the group consisting of hydrogen, chlorine and bromine.
3. 9-p-guanylbenzalfluorene.
4. 1,1-bis-p-chlorophenyl-2-p-guanylphenylethylene.
5. 9-[p-(N-β-diethylaminoethyl)guanylbenzal]fluorene.

References Cited in the file of this patent

UNITED STATES PATENTS

| | | |
|---|---|---|
| 2,375,740 | Barber et al. | May 8, 1945 |
| 2,394,003 | Newberry et al. | Feb. 6, 1946 |
| 2,425,221 | Barber | Aug. 5, 1947 |